(12) United States Patent
Zou et al.

(10) Patent No.: US 11,126,301 B2
(45) Date of Patent: Sep. 21, 2021

(54) POWER ADAPTER CONTROL METHOD AND CONTROL APPARATUS

(71) Applicant: HONOR DEVICE CO., LTD., Shenzhen (CN)

(72) Inventors: Jie Zou, Shenzhen (CN); Lianming Zhang, Shenzhen (CN); Wenfeng Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 41 days.

(21) Appl. No.: 16/304,459

(22) PCT Filed: May 23, 2017

(86) PCT No.: PCT/CN2017/085584
§ 371 (c)(1),
(2) Date: Nov. 26, 2018

(87) PCT Pub. No.: WO2017/202315
PCT Pub. Date: Nov. 30, 2017

(65) Prior Publication Data
US 2019/0146632 A1    May 16, 2019

(30) Foreign Application Priority Data
May 26, 2016    (CN) .......................... 201610363271.2

(51) Int. Cl.
*G06F 3/041* (2006.01)
*H02J 7/04* (2006.01)
(Continued)

(52) U.S. Cl.
CPC ............ *G06F 3/0418* (2013.01); *H02J 7/022* (2013.01); *H02J 7/04* (2013.01); *H02J 7/045* (2013.01); *G06F 3/044* (2013.01)

(58) Field of Classification Search
CPC .......... G06F 3/0418; G06F 3/044; G06F 1/26; H02J 7/04; H02J 7/045; H02J 7/022
See application file for complete search history.

(56) References Cited

U.S. PATENT DOCUMENTS 8,810,546 B1 *   8/2014   Kremin ............... G06F 3/04166
                                                345/174
9,811,204 B2 *  11/2017   Sauer .................... G06F 3/0418
(Continued)

FOREIGN PATENT DOCUMENTS

CN    102830837 A    12/2012
CN    102841715 A    12/2012
(Continued)

OTHER PUBLICATIONS

Office Action issued in Chinese Application No. 201610363271.2 dated Dec. 30, 2019, 14 pages (with English translation).
(Continued)

*Primary Examiner* — Benyam Ketema
(74) *Attorney, Agent, or Firm* — Fish & Richardson P.C.

(57) ABSTRACT

A power adapter control method is provided. The method includes: obtaining a scanning frequency of the TP and a strength of common mode noise generated by a power adapter at the scanning frequency of the TP; determining whether the strength of the common mode noise is greater than or equal to a preset threshold; and when the strength of the common mode noise is greater than or equal to the preset threshold, adjusting a working frequency of a control IC of the power adapter, so that a strength of common mode noise newly generated by the power adapter at the scanning frequency of the TP is less than the preset threshold. The embodiments of the present invention are used for a process of reducing interference of the common mode noise to the TP.

10 Claims, 8 Drawing Sheets

(51) Int. Cl.
*H02J 7/02* (2016.01)
*G06F 3/044* (2006.01)

(56) References Cited

U.S. PATENT DOCUMENTS

| | | | | | |
|---|---|---|---|---|---|
| 2008/0279324 | A1* | 11/2008 | Lin | ............... | H03K 7/06 375/376 |
| 2012/0268417 | A1* | 10/2012 | Mo | ............... | G06F 3/04182 345/174 |
| 2013/0069895 | A1* | 3/2013 | Lo | ............... | G06F 3/04184 345/173 |
| 2013/0212031 | A1* | 8/2013 | Barnfield | ............... | G06Q 10/06 705/320 |
| 2013/0342171 | A1* | 12/2013 | Grivas | ............... | G06F 3/044 320/137 |
| 2014/0057681 | A1* | 2/2014 | Grivas | ............... | G06F 3/044 455/566 |
| 2014/0362040 | A1* | 12/2014 | Mo | ............... | G06F 3/0416 345/174 |
| 2015/0077402 | A1* | 3/2015 | Ye | ............... | G06F 3/0418 345/178 |
| 2019/0286277 | A1* | 9/2019 | Zhang | ............... | G06F 3/04182 |

FOREIGN PATENT DOCUMENTS

| | | |
|---|---|---|
| CN | 102968230 A | 3/2013 |
| CN | 103001301 A | 3/2013 |
| CN | 103091586 A | 5/2013 |
| CN | 103677449 A | 3/2014 |
| CN | 103780996 A | 5/2014 |
| CN | 103995618 A | 8/2014 |
| CN | 103997096 A | 8/2014 |
| CN | 104662765 A | 5/2015 |
| CN | 105045426 A | 11/2015 |
| CN | 105070711 A | 11/2015 |
| CN | 105093007 A | 11/2015 |
| CN | 105204684 A | 12/2015 |
| CN | 105528117 A | 4/2016 |
| WO | 2013174328 A1 | 11/2013 |
| WO | 2014023147 A1 | 2/2014 |

OTHER PUBLICATIONS

Extended European Search Report issued in European Application No. 17802161.4 dated Jan. 17, 2019, 10 pages.

Office Action issued in Chinese Application No. 201610363271.2 dated Jun. 5, 2019, 6 pages.

International Search Report and Written Opinion issued in International Application No. PCT/CN2017/085584 dated Aug. 30, 2017, 17 pages.

* cited by examiner

POWER ADAPTER CONTROL METHOD AND CONTROL APPARATUS

This application is a National Stage of International Application No. PCT/CN2017/085584, filed on May 23, 2017, which claims priority to Chinese Patent Application No. 201610363271.2, filed on May 26, 2016. Both of the aforementioned applications are hereby incorporated by reference in their entireties.

TECHNICAL FIELD

The present invention relates to the computer technology field, and in particular, to a power adapter control method and a control apparatus.

BACKGROUND

Continuous development of communications technologies has resulted in growing popularity of terminal devices (such as mobile phones) in people's daily life. With development of technologies, most terminal devices use a touch panel (English: Touch Panel, TP for short) to provide a human-computer interaction interface. It is well known that, a terminal device with a touch panel usually consumes a large amount of power, and therefore needs to be charged frequently. However, a power adapter is generally a switch charger. During charging, a switching frequency of the switch charger is greater than 20 kHz, and electromagnetic interference of the switch charger is relatively large. As shown by a frequency spectrum of common mode noise generated by a power adapter in FIG. 1, the common mode noise generated by the power adapter may have relatively large amplitudes in a plurality of frequency bands. In a frequency spectrum diagram of a working signal of a TP shown in FIG. 1, when a scanning frequency (shown in FIG. 1) of the TP is corresponding to a wave crest of the common mode noise generated by the power adapter, the common mode noise generated by the power adapter may cause relatively large interference to the TP, resulting in a TP abnormality, such as slow response, error reported contact coordinates, or no response. In addition, with increasingly popular application of high-current fast-charging power adapters, an amplitude of the common mode noise generated by the power adapter increases with a current. This further increases interference to the TP.

In the prior art, to reduce interference of the common mode noise generated by the power adapter to the TP, a control integrated chip (English: Integrated Chip, IC for short) of the TP may detect the common mode noise generated by the power adapter and determine whether the amplitude of the noise exceeds a preset threshold. When determining that the amplitude of the noise exceeds the preset threshold, the control IC of the TP may adjust a scanning frequency of the TP to a preset frequency, so that the adjusted working frequency is corresponding to a wave trough (shown in FIG. 2) of the common mode noise generated by the power adapter, thereby reducing interference of the common mode noise generated by the power adapter to the TP.

There are at least the following problems in the prior art.

1. When the common mode noise generated by the power adapter is relatively large in an entire working frequency band of the TP (for example, noise is high in broadband), the control IC of the TP cannot find a noise-free working frequency no matter how a scanning frequency of the TP is adjusted. In this case, interference of the common mode noise generated by the power adapter to the TP cannot be reduced.

2. When the control IC of the TP adjusts the scanning frequency of the TP from a default working frequency to a new working frequency, the control IC of the TP may also perform operations such as refreshing a working baseline and discarding reported contact coordinates information. In this case, if a user performs slide operations continuously on the TP, the TP may not respond (for example, when the user performs slide operations continuously on the TP, there is a breakpoint phenomenon), affecting user experience.

SUMMARY

Embodiments of the present invention provide a power adapter control method and a control apparatus, to resolve a problem that occurs when a method of adjusting a scanning frequency of a TP is used to prevent common mode noise generated by a power adapter from interfering with the TP, where the problem is that interference of the common mode noise generated by the power adapter to the TP cannot be reduced because a noise-free working frequency cannot be found when the common mode noise generated by the power adapter is relatively large in an entire working frequency band of the TP, and to avoid a phenomenon that the TP does not respond when a user performs sliding operations continuously on the TP.

To achieve the foregoing objectives, the following technical solutions are used in the embodiments of the present invention.

A first aspect of the embodiments of the present invention provides a power adapter control method, including: obtaining, by a control apparatus, a scanning frequency of a TP, and obtaining a strength of common mode noise generated by a power adapter at the scanning frequency of the TP; determining whether the obtained strength of the common mode noise is greater than or equal to a preset threshold; and when the strength of the common mode noise is greater than or equal to the preset threshold, adjusting, by the control apparatus, a working frequency of a control IC of the power adapter according to the scanning frequency of the TP, so that a strength of common mode noise newly generated by the power adapter at the scanning frequency of the TP is less than the preset threshold, where when the strength of the common mode noise is greater than or equal to the preset threshold, it indicates that the common mode noise generated by the power adapter interferes with the TP.

The scanning frequency of TP is a frequency at which the control IC of the TP sends a driving signal when the TP is in a working state.

It should be noted that the threshold used to determine whether the common mode noise generated by the power adapter interferes with the TP may be set according to a requirement of an actual application scenario. This is not specifically limited in the embodiments of the present invention.

According to the power adapter control method provided in the embodiments of the present invention, the control apparatus determines whether the obtained strength of the common mode noise generated by the power adapter at the scanning frequency of the TP is greater than or equal to the preset threshold; and when determining that the strength of the common mode noise is greater than or equal to the preset threshold, adjusts the working frequency of the control IC of the power adapter according to the obtained scanning frequency of the TP, so that the strength of the common mode noise newly generated by the power adapter at the scanning frequency of the TP is less than the preset threshold. In this way, the working frequency of the control IC of the power adapter is adjusted, so that the common mode noise generated by the power adapter does not interfere with the TP at the TP scanning frequency, so as to resolve a problem that occurs when a method of adjusting a scanning frequency of a TP is used to prevent the common mode noise generated by the power adapter from interfering with the TP, where the problem is that interference of the common mode noise generated by the power adapter to the TP cannot be reduced because a noise-free working frequency cannot be found when the common mode noise generated by the power adapter is relatively large in an entire working frequency band of the TP. In addition, there is no need to adjust the scanning frequency of the TP. Therefore, the control IC of the TP does not need to perform an operation of refreshing a working baseline, thereby avoiding a phenomenon that the TP does not respond when a user performs sliding operations continuously on the TP, and improving user experience.

With reference to the first aspect, in a first possible implementation, the working frequency of the control IC of the power adapter may be adjusted by performing the following step, so that the strength of the common mode noise newly generated by the power adapter at the scanning frequency of the TP is less than the preset threshold: The control apparatus sends control information to the control IC of the power adapter according to the scanning frequency of the TP, where the control information is used to instruct the control IC of the power adapter to adjust the working frequency of the control IC, so that the strength of the common mode noise newly generated by the power adapter at the scanning frequency of the TP is less than the preset threshold.

After receiving the control information, the control IC of the power adapter can adjust the working frequency of the control IC according to the control information, so that the common mode noise newly generated by the power adapter at the scanning frequency of the TP does not interfere with the TP.

In the embodiments of the present invention, the control IC of the power adapter may adjust the working frequency of the control IC by adjusting a resistance value of a resistor and/or a capacitance value of a capacitor that are/is included in an oscillation circuit of a control circuit of the control IC.

With reference to the first aspect and the foregoing possible implementation, in another possible implementation,
to reduce impact on output efficiency of the power adapter, the control apparatus may obtain the scanning frequency of the TP and the strength of the common mode noise generated by the power adapter at the scanning frequency of the TP after determining that the TP is in the working state, so that the working frequency of the control IC of the power adapter is adjusted when the common mode noise generated by the power adapter interferes with the TP in the working state.

With reference to the first aspect and the foregoing possible implementations, in another possible implementation,
the scanning frequency of the TP is known at the control IC of the TP, and therefore, the scanning frequency of the TP may be obtained by performing the following step: The control apparatus reads the scanning frequency of the TP from the control IC of the TP.

With reference to the first aspect and the foregoing possible implementations, in another possible implementation,
the strength of the common mode noise generated by the power adapter at the scanning frequency of the TP may be obtained by performing the following step: reading, from the control IC of the TP, the strength of the common mode noise generated by the power adapter at the scanning frequency of the TP; or detecting the strength of the common mode noise generated by the power adapter at the scanning frequency of the TP.

A second aspect of the embodiments of the present invention provides a control apparatus, including:
an obtaining unit, configured to obtain a scanning frequency of a touch panel TP and a strength of common mode noise generated by a power adapter at the scanning frequency of the TP;
a judging unit, configured to determine whether the strength of the common mode noise obtained by the obtaining unit is greater than or equal to a preset threshold; and
a control unit, configured to: when the strength of the common mode noise obtained by the judging unit is greater than or equal to the preset threshold, adjust a working frequency of a control IC of the power adapter according to the scanning frequency of the TP, so that a strength of common mode noise newly generated by the power adapter at the scanning frequency of the TP is less than the preset threshold.

For a specific implementation, refer to a behavior function of the control apparatus in the power adapter control method according to the first aspect or the possible implementations of the first aspect.

A third aspect of the embodiments of the present invention provides a control apparatus, including at least one processor, a memory, and a communications interface, where
the memory is configured to store an instruction; and
the processor is configured to execute the power adapter control method according to the first aspect or the possible implementations of the first aspect, to implement the functions of the obtaining unit, the judging unit, and the control unit included in the second aspect or the possible implementations of the second aspect.

With reference to the third aspect, in another possible implementation,
the communications interface is configured to execute the power adapter control method according to the possible implementations of the first aspect, to implement the function of the receiving unit in the possible implementations of the second aspect.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A basic principle of the embodiments of the present invention is: A control apparatus obtains a scanning frequency of a TP and obtains a strength of common mode noise generated by a power adapter at the scanning frequency of the TP, then determines whether the obtained strength of the common mode noise is greater than or equal to a preset threshold, and when determining that the obtained strength of the common mode noise is greater than or equal to the preset threshold, adjusts a working frequency of a control IC of the power adapter according to the obtained scanning frequency of the TP, so that a strength of common mode noise newly generated by the power adapter at the scanning frequency of the TP is less than the preset threshold. In this way, when a method of adjusting a scanning frequency of a TP is used to prevent the common mode noise generated by the power adapter from interfering with the TP, a problem that interference of the common mode noise generated by the power adapter to the TP cannot be reduced because a noise-free working frequency cannot be found when the common mode noise generated by the power adapter is relatively large in an entire working frequency band of the TP can be resolved, and a phenomenon that the TP does not respond when a user performs sliding operations continuously on the TP can be avoided.

The following provides descriptions of implementations of the present invention in detail with reference to accompanying drawings.

Figure 1:
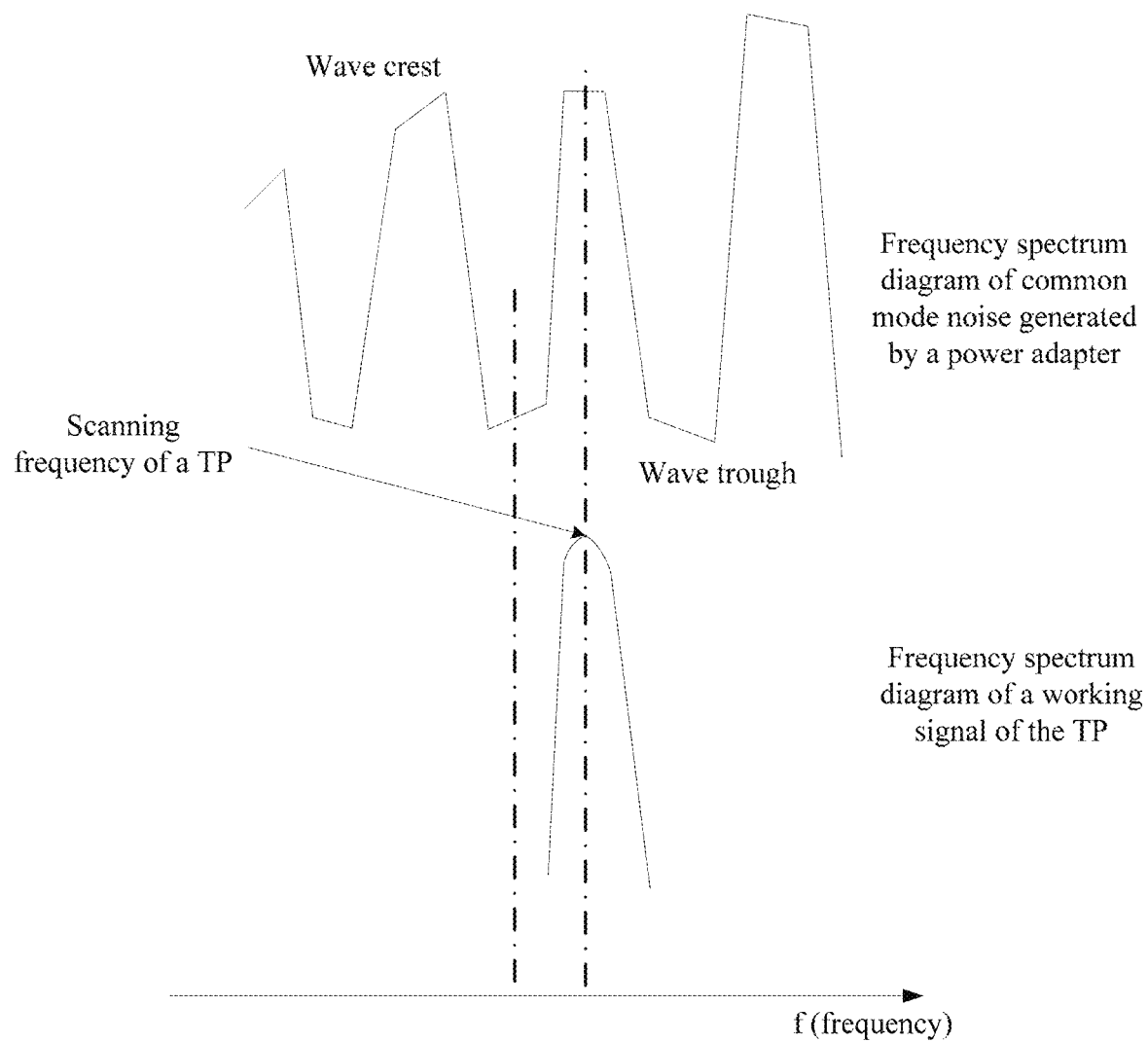
FIG. 1 is a frequency spectrum diagram of common mode noise generated by a power adapter and a frequency spectrum diagram of a working signal of a TP in the prior art according to the present invention.
Figure 2:
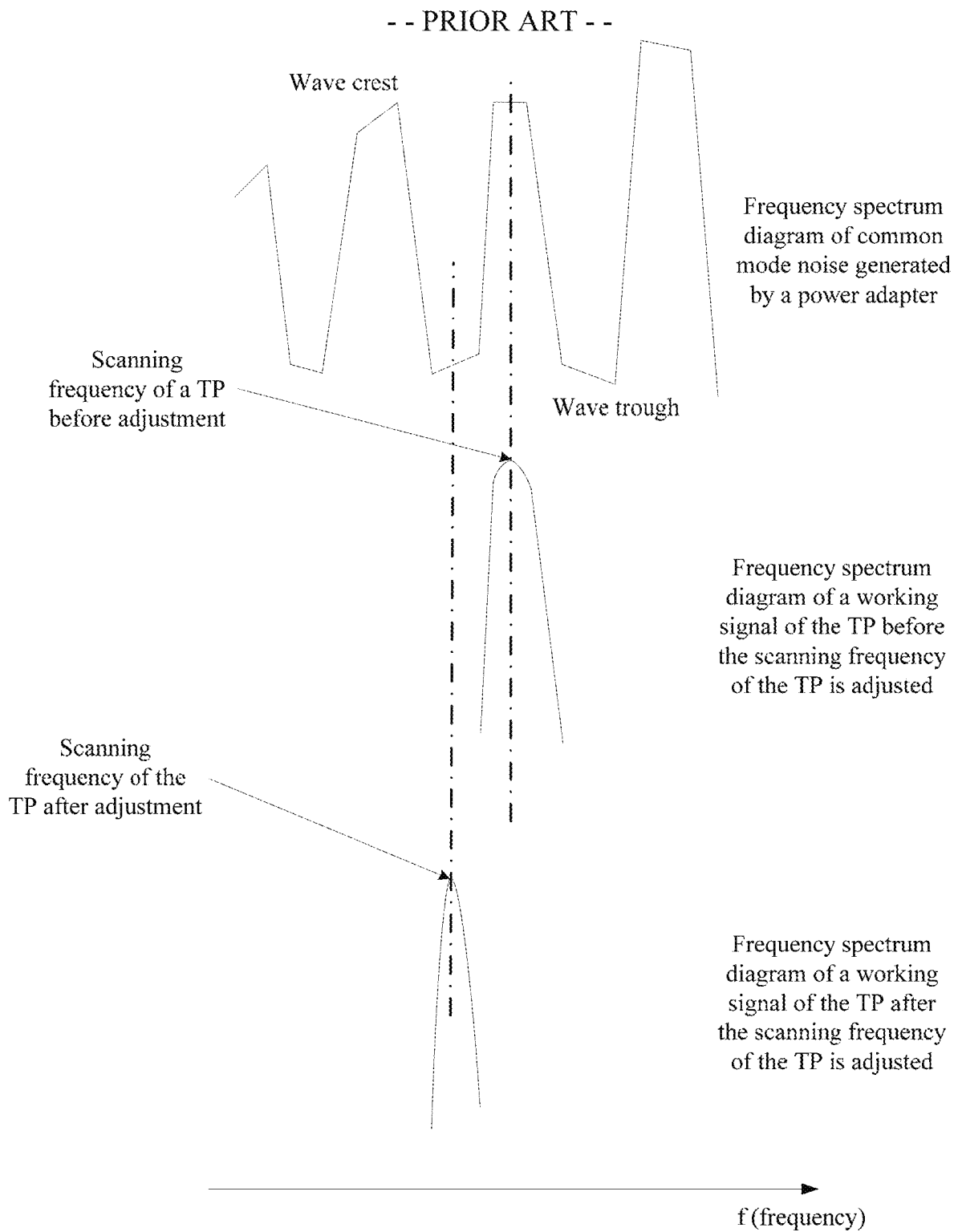
FIG. 2 is a frequency spectrum diagram of common mode noise generated by a power adapter and a frequency spectrum diagram of a working signal of a TP before and after adjustment of a scanning frequency of the TP in the prior art according to the present invention.
Figure 3:
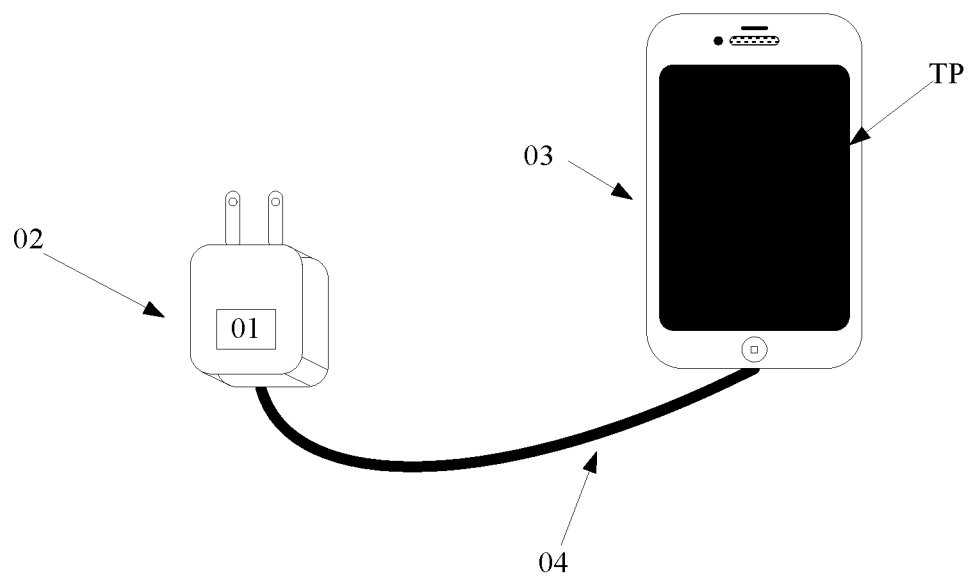
FIG. 3 is a schematic diagram of a system architecture applied in an embodiment of the present invention according to an embodiment of the present invention.

As shown in FIG. 3, FIG. 3 shows a simplified schematic diagram of a system architecture applied in an embodiment of the present invention. The system architecture may include a control apparatus 01, a power adapter 02, a TP-equipped terminal device 03, and a Universal Serial Bus (English: Universal Serial Bus, USB for short) cable 04.

The power adapter 02 can charge the terminal device 03 by using the USB cable 04.

The terminal device 03 may be a TP-equipped electronic device such as a mobile phone or a tablet.

The power adapter 02 may include a housing, a transformer, a metal oxide semiconductor (English: Metal Oxide Semiconductor, MOS for short) switching tube, an inductor, a capacitor, a control IC, a printed circuit board (English: Printed circuit board, PCB for short) board, and another component.

It should be noted that, in this embodiment of the present invention, the control apparatus 01 may be included in the power adapter 02, or may be included in the terminal device 03. A disposition location of the control apparatus 01 is not specifically limited in this embodiment of the present invention. In specific implementation, for example, in an embodiment, the control apparatus 01 is separately disposed in the power adapter 02, as shown in FIG. 3.

Figure 4:
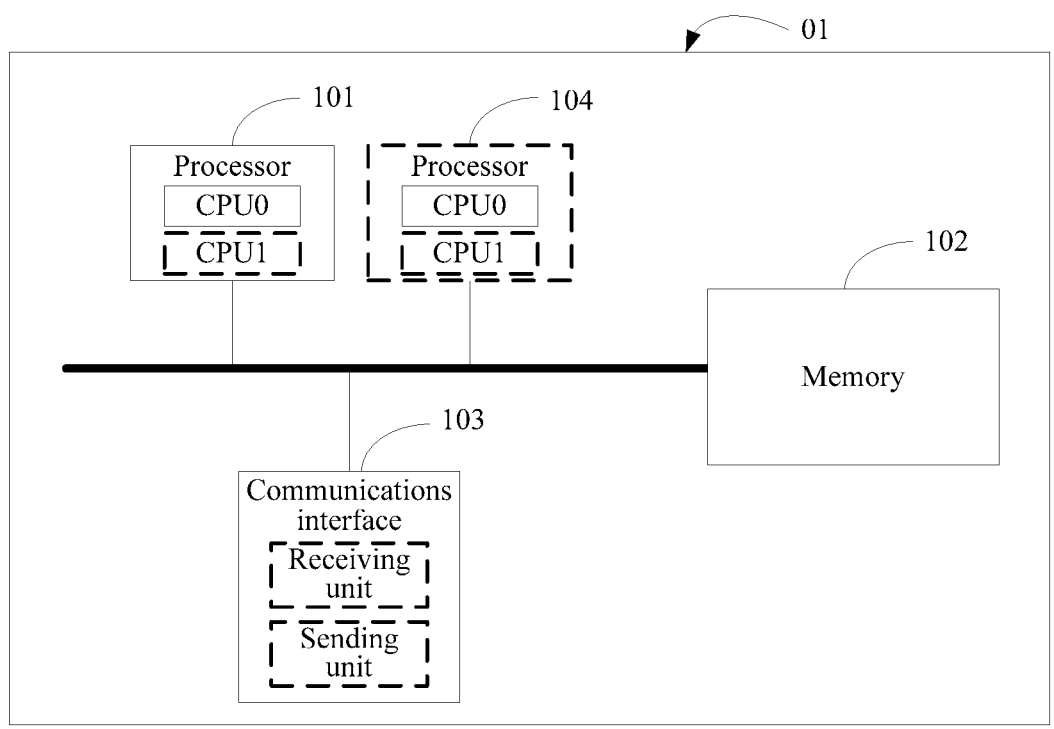
FIG. 4 is a schematic diagram of compositions of a control apparatus according to an embodiment of the present invention.

As shown in FIG. 4, the control apparatus 01 shown in FIG. 3 may include at least one processor 101, a memory 102, and a communications interface 103.

Constitution components of the control apparatus 01 are described in detail with reference to FIG. 4 in the following.

The processor 101 may be a processor, or may be a general term of a plurality of processing elements. For example, the processor 101 may be a central processing unit (English: Central Processing Unit, CPU for short), may be an application specific integrated circuit (English: Application Specific Integrated Circuit, ASIC for short), or may be configured as one or more integrated circuits for implementing this embodiment of the present in invention, for example, one or more microprocessors (English: digital signal processor, DSP for short), or one or more field programmable gate arrays (English: Field Programmable Gate Array, FPGA for short).

The processor 101 may execute various functions of the control apparatus 01 by running or executing a software program stored in the memory 102 and calling data stored in the memory 102.

In specific implementation of an embodiment, the processor 101 may include one or more CPUs, for example, a CPU0 and a CPU1 in FIG. 4.

In specific implementation, in an embodiment, the control apparatus 01 may include a plurality of processors, for example, the processor 101 and a processor 104 shown in FIG. 4. Each of these processors may be a single-core (single-CPU) processor, or may be a multi-core (multi-CPU) processor. The processor herein may be one or more devices, circuits, and/or processing cores for processing data (for example, computer program instructions).

The memory 102 may be a read-only memory (English: read-only memory, English: ROM) or another type of static storage device that may store static information and instructions, or a random access memory (English: random access memory, English: RAM) or another type of dynamic storage device that may store information and instructions, or may be an electrically erasable programmable read-only memory (English: Electrically Erasable Programmable Read-Only Memory, English: EEPROM), a read-only optical disc (English: Compact Disc Read-Only Memory, English: CD-ROM), another optical disc storage medium, an optical disc storage medium (including a compact disc, a laser disc, an optical disc, a digital versatile disc, a Blu-ray disc, or the like), or a magnetic disc storage medium, another magnetic storage device, or any other medium that can be used to carry or store expected program code in a structural form of an instruction or data and that can be accessed by a computer, but is not limited thereto. The memory may exist independently, and is connected to the processor by using the bus. The memory may be integrated with the processor.

The memory 102 is configured to store and execute a software program of a solution of this embodiment of the present invention, and the processor 101 controls execution.

The communications interface 103 is configured to communicate with another device by using a transceiver or a similar apparatus, and the communications interface 103 may include a receiving unit to implement a receiving function and a sending unit to implement a transmitting function.

When the control apparatus 01 is included in the power adapter 02, the processor 101 may be a control IC of the power adapter 02, or may be disposed separately. When the control apparatus 01 is included in the terminal device 03, the processor 101 may be a processor of the terminal device 03, or may be disposed separately.

The memory 102 of the control apparatus 01 may be a memory of the power adapter 02 or a memory of the terminal device 03 according to a disposition location, or may be disposed separately.

The communications interface 103 may be a USB interface or a short-range communications interface such as a Bluetooth interface or a Wi-Fi interface.

A device structure shown in FIG. 4 does not constitute any limitation on the control apparatus, and may include parts more or fewer than those shown in the figure, or a combination of some parts, or parts disposed differently.

In specific implementation, the processor 101 is configured to: obtain a scanning frequency of a TP and a strength of common mode noise generated by a power adapter at the scanning frequency of the TP; determine whether the strength of the common mode noise is greater than or equal to a preset threshold; and when the strength of the common mode noise is greater than or equal to the preset threshold, adjust a working frequency of a control IC of the power adapter according to the scanning frequency of the TP, so that a strength of common mode noise newly generated by the power adapter at the scanning frequency of the TP is less than the preset threshold.

Figure 5:
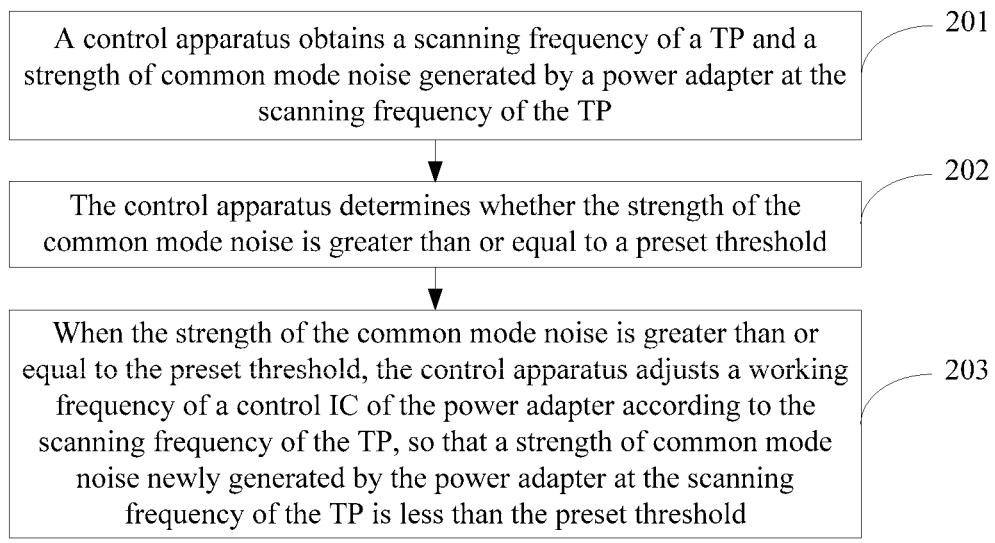
FIG. 5 is a flowchart of a power adapter control method according to an embodiment of the present invention.

FIG. 5 is a flowchart of a power adapter control method according to an embodiment of the present invention. As shown in FIG. 5, the method may include the following steps.

201. A control apparatus obtains a scanning frequency of a TP and a strength of common mode noise generated by a power adapter at the scanning frequency of the TP.

The strength of the common mode noise generated by the power adapter at the scanning frequency of TP is a strength of the common mode noise generated when a frequency of the common mode noise is a scanning frequency of the TP.

202. The control apparatus determines whether the strength of the common mode noise is greater than or equal to a preset threshold.

To prevent the common mode noise generated by the power adapter from interfering with the TP, the control apparatus may obtain two parameters including the scanning frequency of the TP and the strength of the common mode noise generated by the power adapter at the scanning frequency of the TP, and after obtaining the two parameters, determine whether the obtained strength of the common mode noise is greater than or equal to the preset threshold, to determine whether the common mode noise generated by the power adapter interferes with the TP.

203. When the strength of the common mode noise is greater than or equal to the preset threshold, the control apparatus adjusts a working frequency of a control IC of the power adapter according to the scanning frequency of the TP, so that a strength of common mode noise newly generated by the power adapter at the scanning frequency of the TP is less than the preset threshold.

When the control apparatus determines that the obtained strength of the common mode noise generated by the power adapter at the scanning frequency of the TP is greater than or equal to the preset threshold, it indicates that the common mode noise generated by the power adapter interferes with the TP. In this case, the control apparatus may adjust the working frequency of the control IC of the power adapter according to the obtained scanning frequency of the TP, to reduce the strength of the common mode noise generated by the power adapter at the scanning frequency of the TP, so that the strength of the common mode noise newly generated by the power adapter at the scanning frequency of the TP is less than the preset threshold, so as to achieve an objective that the common mode noise generated by the power adapter does not interfere with the TP.

According to the power adapter control method provided in this embodiment of the present invention, the control apparatus determines whether the obtained strength of the common mode noise generated by the power adapter at the scanning frequency of the TP is greater than or equal to the preset threshold; and when determining that the strength of the common mode noise is greater than or equal to the preset threshold, adjusts the working frequency of the control IC of the power adapter according to the obtained scanning frequency of the TP, so that the strength of the common mode noise newly generated by the power adapter at the scanning frequency of the TP is less than the preset threshold. In this way, the working frequency of the control IC of the power adapter is adjusted, so that the common mode noise generated by the power adapter does not interfere with the TP at the TP scanning frequency, so as to resolve a problem that occurs when a method of adjusting a scanning frequency of a TP is used to prevent the common mode noise generated by the power adapter from interfering with the TP, where the problem is that interference of the common mode noise generated by the power adapter to the TP cannot be reduced because a noise-free working frequency cannot be found when the common mode noise generated by the power adapter is relatively large in an entire working frequency band of the TP. In addition, there is no need to adjust the scanning frequency of the TP. Therefore, the control IC of the TP does not need to perform an operation of refreshing a working baseline, thereby avoiding a phenomenon that the TP does not respond when a user performs sliding operations continuously on the TP, and improving user experience.

Figure 6:
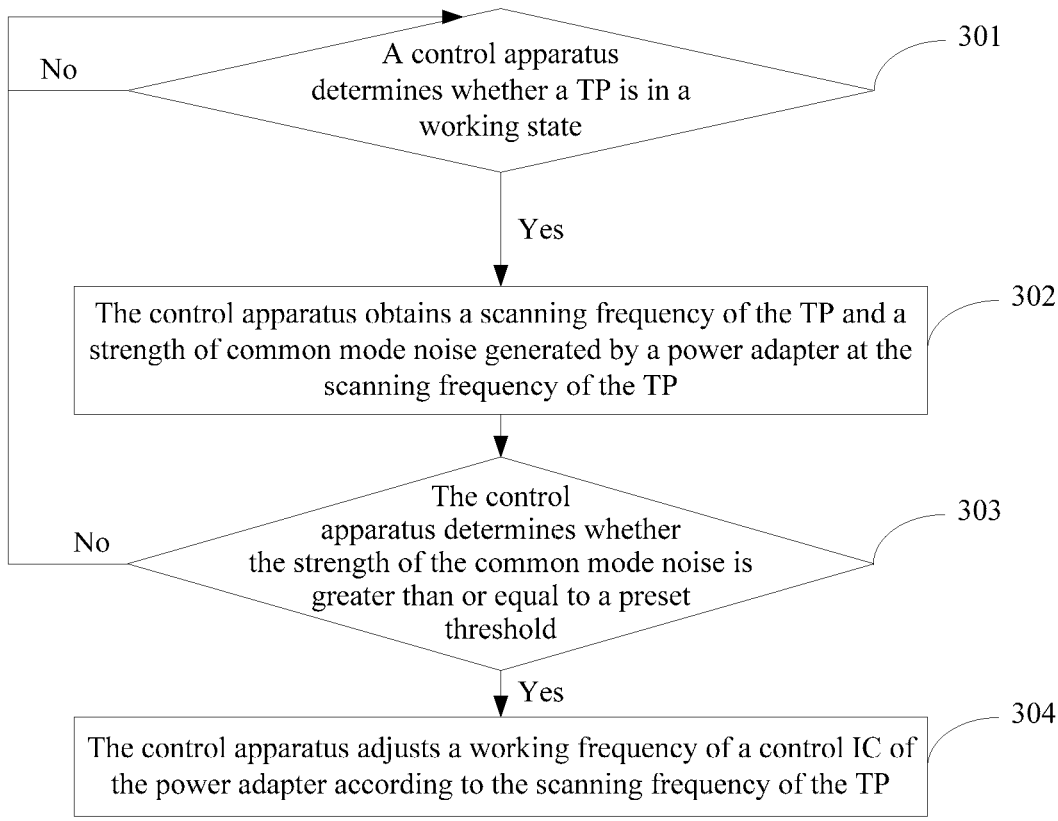
FIG. 6 is a flowchart of another power adapter control method according to an embodiment of the present invention.

FIG. 6 is a flowchart of another power adapter control method according to an embodiment of the present invention. As shown in FIG. 6, the method may include the following steps.

301. A control apparatus determines whether a TP is in a working state.

To reduce impact on output efficiency of the power adapter, the control apparatus may monitor whether the TP is a working state, and when obtaining, by means of monitoring, that the TP is in the working state, detect whether common mode noise generated by the power adapter interferes with the TP. In this embodiment of the present invention, the control apparatus may determine whether the TP is in the working state by determining whether state information that is sent by the control IC of the TP and that is used to indicate that the TP is in the working state is received. A touch operation can be detected when the TP is in the working state. In some devices, when the touch panel lights, the TP is in the working state and may detect an operation. In some devices, when the touch panel does not light, the TP can also be in the working state and detect an operation, and may implement some operations in a panel off state.

When the control apparatus determines that the TP is in the working state, step 302 may be performed. When the control apparatus determines that the TP is not in the working state, step 301 may be performed again, to continue to monitor whether the TP is in the working state. When the TP is not in the working state, the power adapter can be charged in an optimal charging manner, for example, being charged by using a high current.

302. The control apparatus obtains a scanning frequency of the TP and a strength of common mode noise generated by a power adapter at the scanning frequency of the TP.

When the control apparatus determines that the TP is in the working state, the control apparatus may obtain the scanning frequency of the TP and the strength of the common mode noise generated by the power adapter at the scanning frequency of the TP, so as to detect subsequently whether the common mode noise generated by the power adapter interferes with the TP.

The scanning frequency of the TP and the strength of the common mode noise generated by the power adapter at the scanning frequency of the TP may be obtained according to a preset period; or may be obtained according to a preset time length, for example, obtained at the beginning of a different charging state after charging duration of different charging states is estimated, obtained at the beginning of constant-current charging, or obtained at the beginning of trickle charging.

In a possible implementation of this embodiment of the present invention, that the control apparatus obtains the scanning frequency of the TP may be specifically: The control apparatus reads the scanning frequency of the TP from the control IC of the TP. In the prior art, the scanning frequency of the TP is known to the control IC of the TP. Therefore, the control apparatus can read the scanning frequency of the TP directly from the control IC of the TP. In specific implementation, when the control apparatus is disposed in the power adapter, the control apparatus can communicate with the control IC of the TP by using a D+ wire and a D– wire of a USB cable, that is, the control apparatus can read the scanning frequency of the TP by using the D+ wire and the D– wire of the USB cable.

In a possible implementation of this embodiment of the present invention, that the control apparatus obtains the strength of the common mode noise generated by the power adapter at the scanning frequency of the TP may be specifically: The control apparatus reads, from the control IC of the TP, the strength of the common mode noise generated by the power adapter at the scanning frequency of TP. In the prior art, the strength of the common mode noise generated by the power adapter at the scanning frequency of the TP is also known to the control IC of the TP. Therefore, the control apparatus can also directly read, from the control IC of the TP, the strength of the common mode noise generated by the power adapter at the scanning frequency of the TP. In specific implementation, when the control apparatus is disposed in the power adapter, the control apparatus may also read, by using the D+ wire and the D– wire of the USB cable, the strength of the common mode noise generated by the power adapter at the scanning frequency of TP. In another possible implementation of this embodiment of the present invention, that the control apparatus obtains the strength of the common mode noise generated by the power adapter at the scanning frequency of the TP may be specifically: The control apparatus detects the strength of the common mode noise generated by the power adapter at the scanning frequency of TP. In specific implementation, the control apparatus may detect a ground wire, a power wire, or a shield layer of the USB cable, or may detect a ground of a terminal device to obtain the strength of the common mode noise generated by the power adapter at the scanning frequency of the TP.

303. The control apparatus determines whether the strength of the common mode noise is greater than or equal to a preset threshold.

After obtaining the scanning frequency of the TP and the strength of the common mode noise generated by the power adapter at the scanning frequency of the TP, the control apparatus may determine, by determining whether the strength of the common mode noise is greater than or equal to the preset threshold, whether the common mode noise generated by the power adapter interferes with the TP. When the strength of the common mode noise is greater than or equal to the preset threshold, it indicates that the common mode noise generated by the power adapter interferes with the TP. In this case, step 304 may be performed. When the strength of the common mode noise is less than the preset threshold, it indicates that the common mode noise generated by the power adapter does not interfere with the TP. In this case, step 301 may be performed again, so that when the common mode noise generated by the power adapter interferes with the TP, the control IC of the power adapter can be controlled in a timely manner by adjusting the working frequency of the control IC, to achieve an objective that the common mode noise generated by the power adapter does not interfere with the TP.

304. The control apparatus adjusts a working frequency of a control IC of the power adapter according to the scanning frequency of the TP.

Specifically, the control apparatus may send control information to the control IC of the power adapter according to the scanning frequency of the TP. The control information is used to instruct the control IC of the power adapter to adjust the working frequency of the control IC, so that a strength of common mode noise newly generated by the power adapter at the scanning frequency of the TP is less than the preset threshold.

Figure 7:
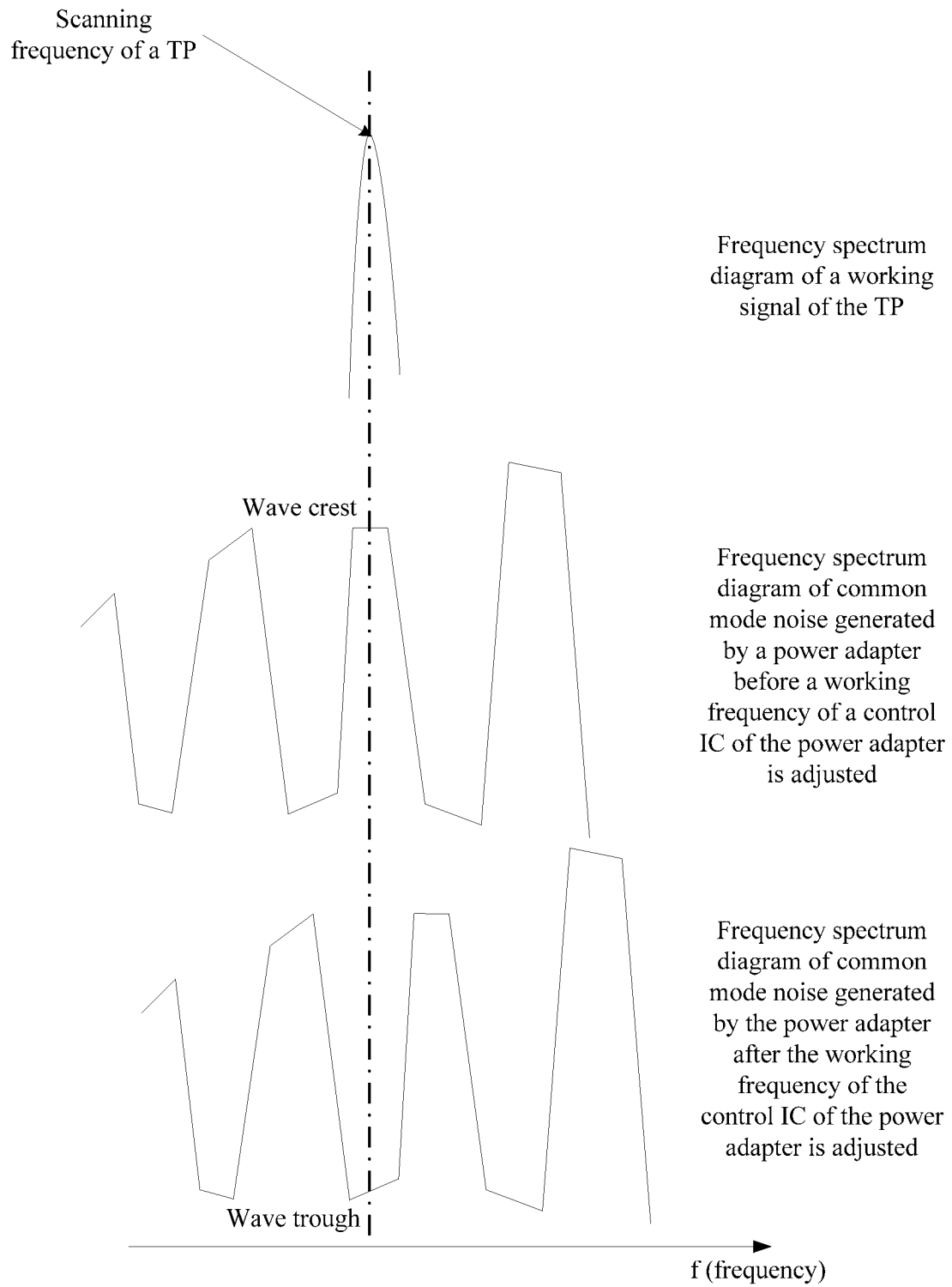
FIG. 7 is a frequency spectrum diagram of a working signal of a TP and a frequency spectrum of common mode noise generated by a power adapter before and after adjustment of a working frequency of a control IC of the power adapter according to an embodiment of the present invention.

The control apparatus may send the scanning frequency of the TP to the control IC of the power adapter, so that the control IC of the power adapter can adjust the working frequency of the control IC according to the scanning frequency of the TP. In this way, the scanning frequency of the TP is in a frequency range of relatively low common mode noise generated by the control IC of the adapter, for example, as shown in FIG. 7, the strength of the common mode noise newly generated by the power adapter at the scanning frequency of the TP is less than the preset threshold. The control IC of the power adapter may calculate, based on the scanning frequency of the TP, the working frequency of the control IC that needs to be adjusted, and accordingly calculate a corresponding circuit parameter value, and adjust a circuit parameter of the control IC, to adjust the working frequency. If the control IC of a circuit adapter adjusts the working frequency of the control IC of the power adapter by adjusting a resistance value, the resistance value that needs to be adjusted is calculated; if the control IC of the circuit adapter adjusts the working frequency of the control IC of the power adapter by adjusting a capacitance value, the capacitance value that needs to be adjusted is calculated; and so on.

The control apparatus may further calculate the working frequency of the control IC of the power adapter, and send the working frequency to the power adapter to instruct the control IC of the power adapter to adjust the working frequency according to a calculation result. The control IC of the power adapter calculates, according to the received working frequency, a corresponding circuit parameter value to adjust the working frequency. Alternatively, the control apparatus may calculate the circuit parameter value for adjusting the working frequency of the control IC of the power adapter, and send the circuit parameter value to the control IC of the power adapter. The control IC of the power adapter adjusts a corresponding circuit parameter according to the received circuit parameter value, to adjust the working frequency of the control IC. If the control IC of a circuit adapter adjusts the working frequency of the control IC of the power adapter by adjusting a resistance value, the control apparatus calculates the resistance value that needs to be adjusted, and sends the resistance value to the control IC of the power adapter; if the control IC of the circuit adapter adjusts the working frequency of the control IC of the power adapter by adjusting a capacitance value, the control apparatus calculates the capacitance value that needs to be adjusted, and sends the capacitance value to the control IC of the power adapter; and so on.

Therefore, the foregoing control information may carry the scanning frequency of the TP, the working frequency that needs to be adjusted by the control IC of the power adapter, or the circuit parameter value that needs to be adjusted by the control IC of the power adapter. A person skilled in the art may develop, according to a design of the power adapter, various technical solutions for adjusting the working frequency of the control IC of the power adapter. This is not limited in this embodiment of the present invention.

According to the foregoing embodiment, the foregoing steps 301 to 304 may be performed circularly during charging; or steps 302 to 304 may be performed when charging starts. After the working frequency of the control IC of the power adapter is adjusted in step 304, a method process is completed, and steps 302 to 304 are performed again for the next charging.

Specifically, the control IC of the power adapter may adjust the working frequency of the control IC by adjusting a resistance of an oscillation circuit of the control IC. For example, in an oscillation circuit shown in FIG. 8, a constant current source is used to charge or discharge an RC oscillation circuit, a sawtooth wave is input at an end of a comparator, and a voltage at another end is a reference voltage (hysteresis). When a resistance value of a resistor R changes, a charging or discharging time of the RC oscillation circuit (the charging or discharging time T of the RC oscillation circuit is equal to R*C) also changes, and an output frequency ($=1/(2\pi RC)$) of the circuit also changes in this case. However, there is a specific correspondence between the output frequency of the circuit and the working frequency of the control IC of the power adapter. Therefore, the working frequency of the control IC of the power adapter also changes. In this case, the resistance value of the resistor R may be adjusted, to achieve the objective of adjusting the working frequency of the control IC of the power adapter. A correspondence between the output frequency of the oscillation circuit and the working frequency of the control IC of the power adapter is associated with a design of a specific power adapter.

Certainly, a capacitance value of a capacitor C in the oscillation circuit may alternatively be changed to achieve the objective of adjusting the working frequency of the control IC of the power adapter. Alternatively, both the resistance value R of the resistor and the capacitance value of the capacitor C in the oscillation circuit may be adjusted to achieve the objective of adjusting the working frequency of the control IC of the power adapter, and a principle is similar to that of adjusting the working frequency of the control IC of the power adapter by changing the resistance value of the resistor R, and is not described in detail in this embodiment of the present invention.

Figure 8:
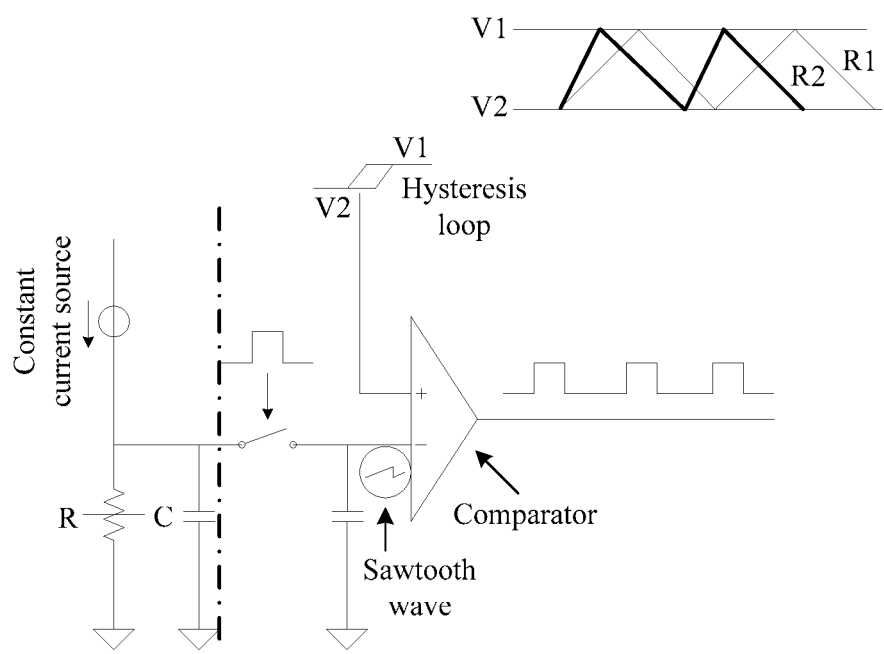
FIG. 8 is an oscillation circuit according to an embodiment of the present invention.

The oscillation circuit shown in FIG. 8 is the RC oscillation circuit. In an actual application, there may be another type of oscillation circuit, such as an LC oscillation circuit. For the LC oscillation circuit, the output frequency of the oscillation circuit may be adjusted by adjusting an inductor L and/or a capacitor C.

The R, C, and L values can be implemented by selecting a circuit. For example, to adjust the resistor R, a selection circuit with a plurality of branches may be configured, and each branch has a different resistance value. The resistance value of the circuit R is adjusted by selecting different branches.

Correspondingly, there are different methods to adjust the working frequency of the control IC based on different circuit designs of the power adapter.

In step 304, the control apparatus may calculate a resistance value, a capacitance value, or an inductance value that needs to be adjusted in the oscillation circuit, and send the resistance value, the capacitance value, or the inductance value to the control IC of the power adapter, so that the control IC of the power adapter adjusts the working frequency of the control IC according to the calculated resistance value, capacitance value, or inductance value.

If the oscillation circuit is disposed outside the control IC and connected to the control IC, the control apparatus may directly adjust the oscillation circuit, so as to adjust the working frequency of the control IC.

When the working frequency of the control IC of the power adapter changes, the strength of the common mode noise newly generated by the power adapter at the scanning frequency of the TP also changes. Therefore, when it is determined that the strength of the common mode noise newly generated by the power adapter at the scanning frequency of TP is less than the preset threshold after the working frequency of the control IC of the power adapter changes, it indicates that the appropriate working frequency of the control IC of the power adapter is found, so that the common mode noise generated by the power adapter does not interfere with the TP.

Figure 9:
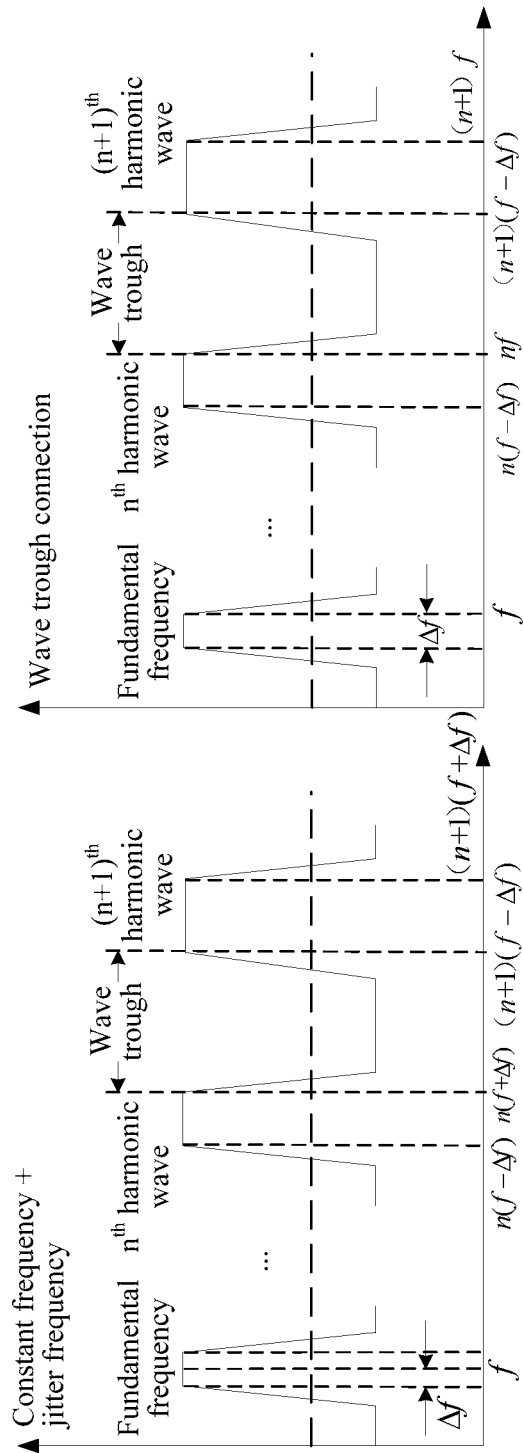
FIG. 9 is a schematic diagram of a waveform of common mode noise according to an embodiment of the present invention.

In specific implementation, it can be considered that when the scanning frequency of the TP is at a frequency location of the common mode noise corresponding to a wave crest of the common mode noise generated by the power adapter, the common mode noise generated by the power adapter interferes with the TP; and when the scanning frequency is at a frequency location of the common mode noise corresponding to a wave trough of the common mode noise generated by the power adapter, the common mode noise generated by the power adapter does not interfere with the TP. Therefore, the working frequency of the control IC of the power adapter can be adjusted, so that the scanning frequency of the TP is at a location of the wave trough of the common mode noise generated by the power adapter, so as to achieve an objective that no interference is generated to the TP. Specifically, a frequency spectrum diagram of the common mode noise generated by the power adapter may be as shown in FIG. 9 (an ideal frequency spectrum diagram). In the left diagram of FIG. 9, f represents the working frequency of the control IC of the power adapter, $\Delta f$ represents a frequency jitter, $\Delta f$ is a known value, and the location of the wave trough of the common mode noise generated by the power adapter ranges from $n(f+\Delta f)$ to $(n+1)(f-\Delta f)$. It can be learned that, when f changes, the location of the wave trough of the common mode noise generated by the power adapter also changes. Therefore, after f changes, if it is determined that a frequency corresponding to a location of the changed wave trough contains the scanning frequency of the TP, it indicates that an appropriate working frequency f of the control IC of the power adapter is found, so that the common mode noise generated by the power adapter does not interfere with the TP. In the right diagram of FIG. 9, f represents the working frequency of the control IC of the power adapter, $\Delta f$ represents a width of a wave crest of a fundamental frequency, $\Delta f$ is a known value, and the location of the wave trough of the common mode noise generated by the power adapter ranges from of to $(n+1)(f-\Delta f)$. It can be learned that, when f changes, the location of the wave trough of the common mode noise generated by the power adapter also changes. Therefore, after f changes, if it is determined that a frequency corresponding to a location of the changed wave trough contains the scanning frequency of the TP, it indicates that an appropriate working frequency f of the control IC of the power adapter is found, so that the common mode noise generated by the power adapter does not interfere with the TP. The foregoing n is an integer greater than or equal to 1.

The left diagram of FIG. 9 is used as an example. The scanning frequency ($f_{TP}$) of the TP may be set to a frequency corresponding to a location of the middle of a wave trough, so that $f_{TP}=n(f+\Delta f)+((n+1)(f-\Delta f-n(f+\Delta f))/2$, that is, $f_{TP}=(n+\frac{1}{2})f-\Delta f/2$, and then $f=(2f_{TP}+\Delta f)/(2n+1)$, where $f_{TP}$ and $\Delta f$ are known; and a value range of n may be enumerated, for example, from 1 to 5. Accordingly, five f values may be obtained. One of the five f values may be chosen as the working frequency f of the control IC, and the selected f value is supported by the power adapter.

The right diagram of FIG. 9 is used as an example. The scanning frequency ($f_{TP}$) of the TP may be set to a frequency corresponding to a location of the middle of a wave trough, so that $f_{TP}=nf+((n+1)(f-\Delta f)-nf)/2$, that is, $f_{TP}=(n+\frac{1}{2})f-(n+1)\Delta f/2$, and then $f=(2f_{TP}+(n+1)\Delta f)/(2n+1)$, where $f_{TP}$ and $\Delta f$ are known; and a value range of n may be enumerated, for example, from 1 to 5. Accordingly, five f values may be obtained. One of the five f values may be chosen as the working frequency f of the control IC, and the selected f value is supported by the power adapter.

In the foregoing examples, only a frequency corresponding to a location of the middle of a wave trough is used as the scanning frequency of the TP. An optional scanning frequency of the TP may be near a left side or a right side of the wave trough. The foregoing manner for calculating f is an example in this embodiment of the present invention. Alternatively, n may be determined according to an adjustable range of the working frequency f of the control IC of the power adapter, so as to determine a value off.

As the foregoing mentioned, the output voltage of the oscillation circuit may be adjusted by adjusting the resistor R, the capacitor C, and the inductor L of the oscillation circuit, so as to adjust the working frequency of the control IC of the power adapter.

According to the power adapter control method provided in this embodiment of the present invention, the control apparatus determines whether the obtained strength of the common mode noise generated by the power adapter at the scanning frequency of the TP is greater than or equal to the preset threshold; and when determining that the strength of the common mode noise is greater than or equal to the preset threshold, adjusts the working frequency of the control IC of the power adapter according to the obtained scanning frequency of the TP, so that the strength of the common mode noise newly generated by the power adapter at the scanning frequency of the TP is less than the preset threshold. In this way, the working frequency of the control IC of the power adapter is adjusted, so that the common mode noise generated by the power adapter does not interfere with the TP at the TP scanning frequency, so as to resolve a problem that occurs when a method of adjusting a scanning frequency of a TP is used to prevent the common mode noise generated by the power adapter from interfering with the TP, where the problem is that interference of the common mode noise generated by the power adapter to the TP cannot be reduced because a noise-free working frequency cannot be found when the common mode noise generated by the power adapter is relatively large in an entire working frequency band of the TP. In addition, there is no need to adjust the scanning frequency of the TP. Therefore, the control IC of the TP does not need to perform an operation of refreshing a working baseline, thereby avoiding a phenomenon that the TP does not respond when a user performs sliding operations continuously on the TP, and improving user experience.

In addition, after determining that the TP is in the working state, if the control apparatus determines that the common mode noise generated by the power adapter interferes with the TP, the control apparatus adjusts the working frequency of the control IC of the power adapter, so as to reduce impact on output efficiency of the power adapter.

Figure 10:
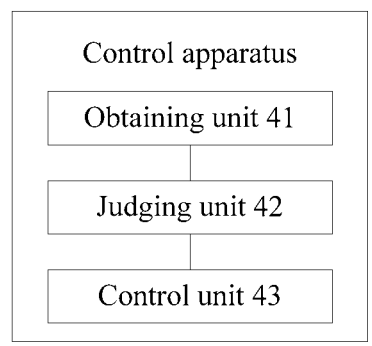
FIG. 10 is a schematic diagram of compositions of another control apparatus according to an embodiment of the present invention.

FIG. 10 is a schematic diagram of compositions of another control apparatus according to an embodiment of the present invention. As shown in FIG. 10, the control apparatus may include an obtaining unit 41, a judging unit 42, and a control unit 43.

The obtaining unit 41 is configured to obtain a scanning frequency of a touch panel TP and a strength of common mode noise generated by a power adapter at the scanning frequency of the TP.

The judging unit 42 is configured to determine whether the strength of the common mode noise obtained by the obtaining unit 41 is greater than or equal to a preset threshold.

The control unit 43 is configured to: when the strength of the common mode noise obtained by the judging unit 42 is greater than or equal to the preset threshold, adjust a working frequency of a control IC of the power adapter according to the scanning frequency of the TP, so that a strength of common mode noise newly generated by the power adapter at the scanning frequency of the TP is less than the preset threshold.

In this embodiment of the present invention, further, the control unit 43 is specifically configured to send control information to the control IC of the power adapter according to the scanning frequency of the TP. The control information is used to instruct the control IC of the power adapter to adjust the working frequency of the control IC, so that the strength of the common mode noise newly generated by the power adapter at the scanning frequency of the TP is less than the preset threshold.

Figure 11:
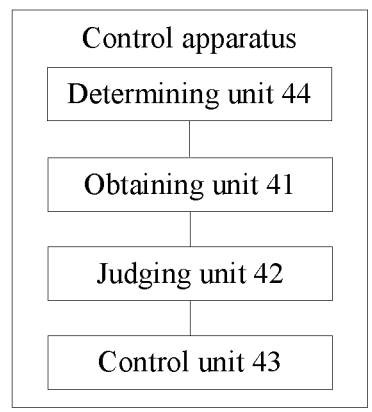
FIG. 11 is a schematic diagram of compositions of still another control apparatus according to an embodiment of the present invention.

In this embodiment of the present invention, further, as shown in FIG. 11, the control apparatus may further include a determining unit 44.

The determining unit 44 is configured to: before the obtaining unit 41 obtains the scanning frequency of the touch panel TP and the strength of the common mode noise generated by the power adapter at the scanning frequency of the TP, determine that the TP is in a working state.

In this embodiment of the present invention, further, the obtaining unit 41 is specifically configured to read the scanning frequency of the TP from the control IC of the TP.

In this embodiment of the present invention, further, the obtaining unit 41 is specifically configured to read, from the control IC of the TP, the strength of the common mode noise generated by the power adapter at the scanning frequency of the TP, or detect the strength of the common mode noise generated by the power adapter at the scanning frequency of the TP.

It should be noted that, for a specific working process of each function module in the control apparatus provided in this embodiment of the present invention, refer to the specific descriptions of the corresponding process in the method embodiment. Details are not described in detail in this embodiment of the present invention.

In addition, in this embodiment of the present invention, the processor 101 and the processor 104 that are included in the control apparatus shown in FIG. 4 may implement, by performing the power adapter control method provided in FIG. 5 or FIG. 6 according to this embodiment of the present invention, functions of the obtaining unit 41, the judging unit 42, the control unit 43, and the determining unit 44 in the control apparatus shown in FIG. 10 or FIG. 11 according to this embodiment of the present invention. For example, the processor 101 and the processor 104 implement, by performing step 201 shown in FIG. 5, a function of the obtaining unit 41 in the control apparatus shown in FIG. 10 or FIG. 11 in this embodiment of the present invention. For another example, the processor 101 and the processor 104 implement, by performing step 303 shown in FIG. 6, a function of the judging unit 42 in the control apparatus shown in FIG. 10 or FIG. 11 in this embodiment of the present invention.

The control apparatus provided in this embodiment of the present invention is configured to execute the foregoing power adapter control method, and therefore, can achieve the same effect as the foregoing power adapter control method.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power adapter control method, comprising:
obtaining a scanning frequency of a touch panel (TP);
obtaining a strength of a common mode noise generated by a power adapter at the scanning frequency of the TP;
determining whether the strength of the common mode noise is greater than or equal to a preset threshold; and
in response to determining that the strength of the common mode noise is greater than or equal to the preset threshold, adjusting a working frequency of a control integrated chip (IC) of the power adapter according to $f=(2f_{TP}+(n+1)\Delta f)/(2n+1)$, wherein f is the working frequency of the control IC of the power adapter, ∂f is a width of a wave crest of a fundamental frequency of the working frequency of the control IC of the power adapter, $f_{TP}$ is the scanning frequency of the TP, and n is an integer and enumerated, so that a strength of a common mode noise newly generated by the power adapter at the scanning frequency of the TP is less than the preset threshold, and wherein after adjusting the working frequency of the control IC of the power adapter, the scanning frequency of the TP is at a location of a wave trough of the common mode noise generated by the power adapter.

2. The method according to claim 1, wherein the adjusting a working frequency of a control IC of the power adapter according to the scanning frequency of the TP, so that a strength of a common mode noise newly generated by the power adapter at the scanning frequency of the TP is less than the preset threshold comprises:

sending control information to the control IC of the power adapter according to the scanning frequency of the TP, wherein the control information is used to instruct the control IC of the power adapter to adjust the working frequency of the control IC, so that the strength of the common mode noise newly generated by the power adapter at the scanning frequency of the TP is less than the preset threshold.

3. The method according to claim 1, further comprising, before the obtaining a scanning frequency of a TP and obtaining a strength of a common mode noise generated by a power adapter at the scanning frequency of the TP:

determining that the TP is in a working state.

4. The method according to claim 1, wherein the obtaining a scanning frequency of a TP comprises:

reading the scanning frequency of the TP from the control IC of the TP.

5. The method according to claim 1, wherein the obtaining a strength of a common mode noise generated by a power adapter at the scanning frequency of the TP comprises at least one of:

reading, from the control IC of the TP, the strength of the common mode noise generated by the power adapter at the scanning frequency of the TP; or detecting the strength of the common mode noise generated by the power adapter at the scanning frequency of the TP.

6. A control apparatus, the control apparatus comprising at least one processor, a memory, and a communications interface, wherein:

the memory is configured to store an instruction; and
the at least one processor is configured to invoke the instruction stored in the memory to cause the control apparatus to:
obtain a scanning frequency of a touch panel (TP); and
obtain a strength of a common mode noise generated by a power adapter at the scanning frequency of the TP;
determine whether the strength of the common mode noise is greater than or equal to a preset threshold; and
in response to determining that the strength of the common mode noise is greater than or equal to the preset threshold, adjust a working frequency of a control integrated chip (IC) of the power adapter according to $f=(2f_{TP}+(n+1)\Delta f)/(2n+1)$, wherein f is the working frequency of the control IC of the power adapter, of is a width of a wave crest of a fundamental frequency of the working frequency of the control IC of the power adapter, $f_{TP}$ is the scanning frequency of the TP, and n is an integer and enumerated, so that a strength of a common mode noise newly generated by the power adapter at the scanning frequency of the TP is less than the preset threshold, and wherein after adjusting the working frequency of the control IC of the power adapter, the scanning frequency of the TP is at a location of a wave trough of the common mode noise generated by the power adapter.

7. The control apparatus according to claim 6, wherein the adjust a working frequency of a control IC of the power adapter according to the scanning frequency of the TP, so that a strength of a common mode noise newly generated by the power adapter at the scanning frequency of the TP is less than the preset threshold comprises:

send control information to the control IC of the power adapter according to the scanning frequency of the TP, wherein the control information is used to instruct the control IC of the power adapter to adjust the working frequency of the control IC, so that the strength of the common mode noise newly generated by the power adapter at the scanning frequency of the TP is less than the preset threshold.

8. The control apparatus according to claim 6, wherein the at least one processor is configured to invoke the instruction stored in the memory to cause the control apparatus to, before the obtain a scanning frequency of a TP and obtain a strength of a common mode noise generated by a power adapter at the scanning frequency of the TP:

determine that the TP is in a working state.

9. The control apparatus according to claim 6, wherein the obtain a scanning frequency of a TP comprises:

read the scanning frequency of the TP from the control IC of the TP.

10. The control apparatus according to claim 6, wherein the obtain a strength of a common mode noise generated by a power adapter at the scanning frequency of the TP comprises at least one of:

read, from the control IC of the TP, the strength of the common mode noise generated by the power adapter at the scanning frequency of the TP; or detect the strength of the common mode noise generated by the power adapter at the scanning frequency of the TP.

* * * * *